3,518,074
BENZOYLCHOLINE HALIDES AS PLANT
GROWTH STUNTING AGENTS
Kisaburo Ueno, Kamakura, Akira Hirose, Yokohama, Yoshio Takazawa, Chigasaki, and Tatsuya Yamamura, Kamakura, Japan, assignors to Mitsui Toatsu Chemicals Incorporated, Tokyo, Japan, a corporation of Japan
No Drawing. Filed Aug. 5, 1966, Ser. No. 570,448
Claims priority, application Japan, Aug. 9, 1965, 40/48,051
Int. Cl. A01n 5/00, 9/24
U.S. Cl. 71—76        6 Claims

ABSTRACT OF THE DISCLOSURE

A composition comprising a botanically acceptable carrier and a growth retarding choline derivative having a fomula:

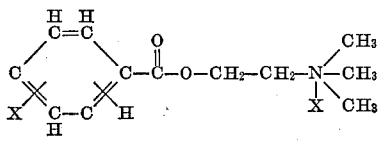

wherein X is chlorine or bromine and X in the benzoyl radical is substituted in the ortho- or para-position, and treating plants therewith to retard their growth.

---

This invention relates to compositions and methods for regulating the growth of plants.

According to the present invention, compositions and methods for regulating the growth of plants are provided by employing as the active ingredient a choline derivative of the formula

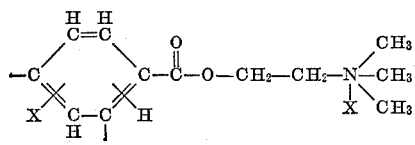

wherein X is chlorine or bromine and X in the benzoyl radical is submitted in the ortho- para-position.

The above-mentioned choline derivative has an action of regulating the growth of plants and dwarfing the plants by acting against the elongating action of gibberellin or the like biologically synthesized in the plant body. As a result, when plants are treated with such choline derivatives, the dwarfing effect can be overcome by treating the plants with large amounts of glibberellin simultaneously with or after the treatment. More specifically, the amount of elongation or growth inhibited when the plants are treated with the choline derivative is completely recovered by the gibberellin treatment. Thus, plant growers can extend for substantial periods the growing time of plants. Moreover, the time of harvesting and marketing the plants can be more readily extended and controlled by the grower without substantial loss in total growth of the plants.

The aforementioned choline derivatives are light yellow crystals insoluble in water but are easily soluble in ethanol. They are easily synthesized by reacting an ortho- or para-halobenzoyl and sodium hydroxide with a choline halide.

The method of the present invention is carried out by applying a growth regulating amount of an above-mentioned choline derivative to the area of plant growth so as to come into contact with the tissues of the plants. That is to say, the choline derivatives are applied to stems and leaves of plants or to the soil in the plant growing area. Such choline is applied at a rate of 10 g. to 1 kg. per are to the soil or at a rate of 1 to 100 g. per are to stems and leaves.

The excellent activity of the choline derivative requires the application of small amounts of the active ingredient distributed uniformly over a wide area. Of course, this is very difficult to do when employing the pure material. However, by increasing the bulk of the substance, for example, such as by mixing the choline derivative with an inert carrier, the application to the plants and soil can be achieved more readily.

Thus, according to the present invention, there is provided a new composition containing the above-mentioned active choline derivative intimately dispersed in an botanically inert carrier. The inert carrier may be either solid, such as, bentonite, talc, diatomaceous earth, calcium carbonate, kaolin, and the like, or liquids, such as, ethanol, methanol, isopropanol, cyclohexane, acetone, petroleum ether, water, toluene, xylene, kerosene, and the like, in which the active agent may be dissolved or dispersed. Preferably, the amount of active ingredient in such composition is 0.01 to 90% of the composition by weight.

A surface active agent may be added to the composition when it is desired to achieve a suitable dispersion or emulsion in liquids such as water to give aqueous sprays. Typical examples of such surface active agents are alkyl benzene sulfonic acid salts, polyglycol fatty acid esters, polyoxyetheylene glycol fatty acid esters, polyoxyethlene glycol fatty acid esters, polyoxyethlene glycol sorbitan alkyl esters, polyoxyethylene gycol alkyl ethers, sodium salts of naphthalene sulfonic acid-Formalin condensates and water-soluble lignin sulfonate salts. It is preferable that the amount of such surface active agent in the composition lies in the range of 0.05 to 15% of the composition by weight.

The following examples are presented. The parts therein are by weight. The term "water capacity" is used in the examples to mean the maximum field capacity of the soil.

EXAMPLE 1

Each of several Neubauer's pots of resin was charged with 600 g. of a mixture of equal amounts of an air dried soil passed through 16 mesh sieve and river sand. A mixed fertilizer containing 50 mg. each of N, $P_2O_5$ and $K_2O$ was applied to and mixed with the soil mixture. The water content in the soil was adjusted to 60% of its water capacity. Nine kidney-beans per pot were sown in each respective pot, covered with the soil 1 cm. deep and grown in a greenhouse at 20° C. Twenty grains of wheat per pot were sown and grown in the same manner. Fifty ml. of a solution of a concentration of $10^{-2}$ mol of the test compound as listed in Table 1 below dissolved in water were poured into each pot. In 10 days, when the kidney-beans developed to the stage of cotyledons and the wheat developed to the stage of the first leaf, 5 ml. of a solution of 10 p.p.m. gibberellin dissolved in a slight amount of ethyl alcohol and diluted with water were sprayed on the stems and leaves of the plants in some of the pots. Observations were made one month after the gibberellin treatment and the results are shown in Table 1. The data are given as indexes compared to the untreated controls as 100.

For comparison with the plant growth regulating agent of the present invention, 2-chloroethyl trimethyl ammonium chloride which is a known growth regulating agent was tested in the same manner. The results are also given in Table 1.

TABLE 1

(1) Kidney-beans

| Treatment | Length of the first internode | Length of the second internode | Length of the bine | Fresh weight | Number of nodes |
|---|---|---|---|---|---|
| Untreated | 100 | 100 | 100 | 100 | 100 |
| Treated with gibberellin alone | 145 | 633 | 872 | 81 | 100 |
| p-Chlorobenzoyl choline chloride: | | | | | |
| Alone | 72 | 23 | 28 | 71 | 100 |
| Later with gibberellin | 128 | 564 | 608 | 94 | 100 |
| o-Chlorobenzoyl choline chloride: | | | | | |
| Alone | 80 | 60 | 40 | 87 | 10 |
| Later with gibberellin | 126 | 504 | 606 | 100 | 1000 |
| p-Chlorobenzoyl choline bromide: | | | | | |
| Alone | 74 | 27 | 21 | 73 | 50 |
| Later with gibberellin | 129 | 391 | 462 | 78 | 100 |
| o-Bromobenzoyl choline bromide: | | | | | |
| Alone | 90 | 70 | 50 | 90 | 100 |
| Later with gibberellin | 127 | 482 | 400 | 100 | 100 |
| 2-Chloroethyl trimethyl ammonium chloride: | | | | | |
| Alone | 74 | 24 | 22 | 79 | 50 |
| Later with gibberellin | 129 | 449 | 464 | 81 | 100 |

(2) Wheat

| Treatment | Length of the second leaf sheath | Plant height | Fresh weight |
|---|---|---|---|
| Untreated | 100 | 100 | 100 |
| Treated with gibberellin alone | 109 | 113 | 104 |
| p-Chlorobenzoyl choline chloride: | | | |
| Alone | 86 | 80 | 93 |
| Later with gibberellin | 102 | 95 | 95 |
| o-Chlorobenzoyl choline chloride: | | | |
| Alone | 92 | 90 | 100 |
| Later with gibberellin | 107 | 107 | 100 |
| p-Chlorobenzoyl choline bromide: | | | |
| Alone | 72 | 74 | 99 |
| Later with gibberellin | 107 | 109 | 113 |
| o-Bromobenzoyl choline bromide: | | | |
| Alone | 94 | 92 | 98 |
| Later with gibberellin | 105 | 108 | 99 |
| 2-Chloroethyl trimethyl ammonium chloride: | | | |
| Alone | 49 | 74 | 100 |
| Later with gibberellin | 89 | 109 | 102 |

EXAMPLE 2

Each of several Neubauer's pots of resin was charged with 600 g. of a mixture of equal amounts of an air dried soil passed through 16 mesh sieve and river sand. A mixed fertilizer containing 50 mg. each of N, $P_2O_5$ and $K_2O$ was applied to the soil mixture. The water content in the soil was adjusted to 60% of its water capacity. Nine kidney-beans were sown in each respective pot, were covered with the soil 1 cm. deep and were grown in a greenhouse at 20° C. Twenty grains of wheat were sown and grown in the same manner. Five ml. of a solution of a concentration of $10^{-2}$ mol of the test compound as listed in Table 2 below dissolved in water were sprayed on the stems and leaves of the plants when the kidney-beans developed to the stage of cotyledons and the wheat developed to the stage of the first leaf.

In 2 days after the spraying, 5 ml. of a solution of 10 p.p.m. of gibberellin dissolved in a slight amount of alcohol and diluted with water were sprayed on the stems and leaves of the plants of some of the pots. In a month the observations listed in Table 2 were made. The data are given as indexes compared with the untreated control as 100.

For comparison with the plant growth regulating agent of the present invention, 2-chloroethyl trimethyl ammonium chloride which is a known plant growth regulating agent was tested in the same manner. The results are also given in Table 2.

TABLE 2

(1) Kidney-beans

| Treatment | Length of the first internode | Length of the second internode | Length of the bine | Fresh weight | Number of nodes |
|---|---|---|---|---|---|
| Untreated | 100 | 100 | 100 | 100 | 100 |
| Treated with gibberellin alone | 108 | 227 | 151 | 113 | 100 |
| p-Chlorobenzoyl choline chloride: | | | | | |
| Alone | 94 | 43 | 87 | 104 | 100 |
| Later with gibberellin | 105 | 236 | 121 | 109 | 100 |
| o-Chlorobenzoyl choline chloride: | | | | | |
| Alone | 98 | 78 | 97 | 104 | 100 |
| Later with gibberellin | 100 | 234 | 123 | 108 | 100 |
| p-Chlorobenzoyl choline bromide: | | | | | |
| Alone | 108 | 67 | 30 | 91 | 92 |
| Later with gibberellin | 113 | 237 | 62 | 117 | 100 |
| o-Bromobenzoyl choline bromide: | | | | | |
| Alone | 99 | 87 | 50 | 94 | 97 |
| Later with gibberellin | 108 | 223 | 108 | 112 | 99 |
| 2-Chloroethyl trimethyl ammonium chloride: | | | | | |
| Alone | 108 | 97 | 10 | 71 | 100 |
| Later with gibberellin | 108 | 285 | 123 | 131 | 100 |

TABLE 2.—Continued (2) Wheat

| Treatment | Length of the second leaf sheath | Plant height | Fresh weight |
|---|---|---|---|
| Untreated | 100 | 100 | 100 |
| Treated with gibberellin alone | 118 | 108 | 100 |
| p-Chlorobenzoyl choline chloride: | | | |
| Alone | 98 | 92 | 114 |
| Later with gibberellin | 125 | 110 | 132 |
| o-Chlorobenzoyl choline chloride: | | | |
| Alone | 98 | 99 | 100 |
| Later with gibberellin | 110 | 102 | 100 |
| p-Chlorobenzoyl choline bromide: | | | |
| Alone | 99 | 98 | 109 |
| Later with gibberellin | 122 | 105 | 118 |
| o-Bromobenzoyl choline bromide: | | | |
| Alone | 99 | 99 | 100 |
| Later with gibberellin | 100 | 107 | 100 |
| 2-Chloroethyl trimethyl ammonium chloride: | | | |
| Alone | 99 | 98 | 109 |
| Later with gibberellin | 122 | 105 | 117 |

EXAMPLE 3

Preparation of a dust 3 parts of o-chlorobenzoyl choline chloride and 97 parts of bentonite are mixed thoroughly and then ground to give a dust suitable for application with conventional dusting equipment.

EXAMPLE 4

Preparation of a wettable powder 50 parts of p-bromobenzoyl choline bromide, 45 parts of talc and 5 parts of polyoxyethylene glycol lauryl ether are mixed thoroughly and then ground to give a wettable powder. This wettable powder is used as dispersed in water to any desired concentration of the active ingredient.

EXAMPLE 5

Preparation of an emulsifiable concentrate 10 parts of p-chlorobenzoyl choline chloride, 0.5 part of Tween-20 (a sorbitan monolaureate polyoxyalkylene glycol derivative) and 89.5 parts of ethyl alcohol are mixed thoroughly to give an emulsifiable concentrate. An aqueous dispersion containing the active compound of any desired concentration is obtained by mixing this emulsifiable concentrate with water.

What is claimed is:

1. A method for retarding plant growth which comprises applying to the living plant tissue an effective amount of a compound of the formula

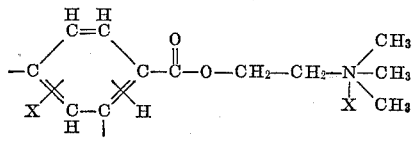

wherein X is a member selected from the group consisting of chlorine and bromine.

2. A method as claimed in claim 1 wherein said compound is p-chlorobenzoyl choline chloride.

3. A method as claimed in claim 1 wherein said compound is o-chlorobenzoyl choline chloride.

4. A method as claimed in claim 1 wherein said compound is o-bromobenzoyl choline chloride.

5. A method as claimed in claim 1 wherein said compound is p-bromobenzoyl choline chloride.

6. Method as claimed in claim 1 wherein gibberellin is subsequently applied to said plant tissue to stimulate plant growth.

References Cited

UNITED STATES PATENTS

| 3,156,554 | 11/1964 | Tolbert | 71—76 |
| 3,156,555 | 11/1964 | Tolbert | 71—76 |
| 3,276,856 | 10/1966 | Esposito | 71—107 |
| 3,301,902 | 1/1967 | Koenig, et al | 71—121 |
| 3,221,042 | 11/1965 | Margot | 260—567.6 |
| 2,394,916 | 2/1946 | Jones | 71—115 |

FOREIGN PATENTS

| 766,427 | 1/1957 | Great Britain. |
| 1,488,624 | 6/1967 | France. |

OTHER REFERENCES

Schreiner et al.: "The Toxic Action of Certain Organic Constituents" (1908), CA 2, pp. 1160–61 (1908).

Wurzel et al.: "The Mode of Action of Chlorine Eaters on Animal Organisms" (1958), CA 54, p. 759 (1960).

Bartels: "Relation Between Acetylcholine and Local Anesthetics" (1965), CA 63, p. 16955 (1965).

Harada et al.: "Effect of Some . . ." (1965), CA 62, p. 9703 (1965).

Chu et al.: "Analogs of Neuroflectors . . ." (1966), CA 64, p. 8009 (1966).

Lur's et al.: "Esters of Choline and Its Homologs" (1941), CA 36, p. 1013 (1942).

Thomas et al.: "The Effect of Ortho Substitution on the Hydrolysis of Benzoylcholine" (1961), CA 55, p. 15399 (1961).

Machon et al.: "Synthesis of Benzoylcholine Derivatives" (1965), CA 65, pp. 2167–68 (1966).

LEWIS GOTTS, Primary Examiner

G. HOLLRAH, Assistant Examiner

U.S. Cl. X.R.

71—89, 107; 260—472